(12) United States Patent
Huang et al.

(10) Patent No.: US 6,188,764 B1
(45) Date of Patent: Feb. 13, 2001

(54) OVER-VOLTAGE PROTECTION CIRCUIT FOR USE WITH A TELEPHONE APPLIANCE

(75) Inventors: Minsiu Huang; Jingwei Lin, both of Saratoga, CA (US)

(73) Assignee: ActionTec Electronics, Inc., Sunnyvale, CA (US)

( * ) Notice: Under 35 U.S.C. 154(b), the term of this patent shall be extended for 0 days.

(21) Appl. No.: 09/085,894

(22) Filed: May 27, 1998

(51) Int. Cl.$^7$ ................................................ H04M 11/00
(52) U.S. Cl. ................................. 379/412; 379/373
(58) Field of Search ................................. 379/412, 373, 379/93.05, 93.36

(56) References Cited

U.S. PATENT DOCUMENTS

| | | | |
|---|---|---|---|
| 3,903,375 | 9/1975 | DeWit | 179/18 |
| 4,317,964 | 3/1982 | Biggs et al. | 179/81 |
| 4,603,234 | 7/1986 | Huet et al. | 179/16 |
| 4,709,296 | 11/1987 | Hung et al. | 361/102 |
| 4,723,267 | 2/1988 | Jones et al. | 379/93 |
| 4,958,371 | 9/1990 | Damoci et al. | 379/377 |
| 5,042,065 | 8/1991 | Kim | 379/165 |
| 5,125,027 | 6/1992 | Blaszykowski et al. | 379/399 |
| 5,140,631 | 8/1992 | Stahl | 379/377 |
| 5,367,569 | * 11/1994 | Roach et al. | 379/412 |
| 5,369,687 | 11/1994 | Farkas | 379/98 |
| 5,392,349 | * 2/1995 | Elder, Jr. | 379/412 |
| 5,532,898 | 7/1996 | Price | 361/119 |
| 5,696,660 | 12/1997 | Price | 361/119 |
| 5,802,151 | 9/1998 | Bevill, Jr. et al. | 379/93.05 |

* cited by examiner

Primary Examiner—Stella Woo
(74) Attorney, Agent, or Firm—Fish & Neave; Nicola A. Pisano

(57) ABSTRACT

Over-voltage protection circuitry for use with a PCMCIA modem card or a mobile modem is disclosed. The protection circuitry detects excessive voltage between the tip and ring lines of a telephone subscriber loop when the modem is "off-hook", and immediately places the modem "on-hook", protecting the line interface circuitry, when the over-voltage condition is detected. The over-voltage protection circuitry of the present invention may share common components and signal lines with the modem's ring-detection circuitry, and may be implemented using a minimal number of additional components.

17 Claims, 3 Drawing Sheets

US 6,188,764 B1

OVER-VOLTAGE PROTECTION CIRCUIT FOR USE WITH A TELEPHONE APPLIANCE

FIELD OF THE INVENTION

The present invention relates to protection of telephone equipment, such as modems, that use public and private telephone lines to communicate data between computers. More particularly, the present invention relates to a circuit for use in a PCMCIA modem card or mobile modem that detects an over-voltage condition on a telephone subscriber line, and protects the modem circuitry from being damaged by the over-voltage condition.

BACKGROUND OF THE INVENTION

With the expansion of remotely-accessible public and private networks, users of personal computers are increasingly employing modem equipment to communicate data across public and private telephone lines. The ability to access a wide variety of data resources from nearly anywhere in the world is increasing the value of personal computers as tools for business and increasing the productivity of personal computer users.

As is well known, a "modem" is a device that interfaces a computer to a telephone line, and permits digital data to be communicated across a telephone line by modulating the outgoing digital data so that it is compatible with telephone networks designed to handle analog signals (e.g. speech traffic). Similarly, a modem demodulates incoming analog signals from a telephone line to recover digital data from the analog signals.

The need for telephone systems and equipment to be compatible and interchangeable has led to the development of physical and electrical standards for interfacing telephone equipment, such as modems, to public and private telephone networks. In the United States, the standard physical connector for telephone equipment is the RJ-11, 6-pin miniature module and plug. The standard cable used to connect telephone equipment to a telephone subscriber loop consists of two wires, which are referred to as "tip" and "ring". These two wires are typically connected to the center two leads of an RJ-11 plug at one end of the cable. The RJ-11 plug is typically plugged into an RJ-11 module in a telephone wall jack, which is connected to a telephone subscriber loop. The telephone equipment may be directly connected to the cable, or may be connected to the cable through an RJ-11 plug, or a proprietary connector.

The electrical interface between telephone equipment and the public telephone network has also been standardized, and in the United States, telephone equipment must meet standards promulgated by the Federal Communications Commission (FCC), and by various telephone companies. Manufacturers of telephone equipment must provide an electrical line interface circuit that moderates all signals that are sent over the public telephone network. The line interface circuit protects the public telephone lines and the public telephone network from damage, and thereby helps insure the integrity of transmissions over public telephone systems.

This line interface circuitry is referred to as Data Access Arrangement (DAA) circuitry that typically provides an impedance match between the telephone equipment and the telephone line, and also isolates and protects the telephone equipment from transient signals and other electrical signals that may be present on a telephone line. The DAA also protects the telephone network from any harmful signals that the telephone equipment may generate. Damage to the public telephone network may result, for example, if a modem accidentally injected direct current (DC) power into the telephone line. The FCC mandated DAA circuit does not permit the telephone equipment to transmit such damaging signals to the telephone network.

The DAA circuit typically includes a circuit, such as a diode bridge full-wave rectifier, that permits the DAA to function regardless of the polarity of the voltage on the tip and ring lines of the public telephone network. The DAA circuit also includes a DC-holding circuit and other circuitry that primarily conducts alternating current (AC) (referred to hereinafter as the DAA AC Circuitry). When the telephone equipment is off-hook, the DC-holding circuit keeps the telephone line active by providing a path for DC current while simultaneously presenting a high impedance to AC signals.

The telephone equipment in many offices, hotels, and other large facilities typically is not connected directly to the public telephone network. Rather, these facilities are increasingly wired so that telephone traffic passes through a "private branch exchange" (PBX). A PBX is an automatic switching system that interconnects the telephone equipment within a facility, and acts as a gateway between an internal telephone network and the public telephone network.

Although the connections between a PBX and the public telephone network must meet all of the applicable standards to prevent damage to the public telephone system, the connections between the PBX and internal telephone equipment are not required to meet these standards. Many PBX systems use wires connected to an RJ-11 plug in a manner different from the public telephone system. Some PBX systems use additional wires connected to the RJ-11 plug to transmit control information between the PBX and specialized telephone equipment designed to be used with that particular PBX.

Some PBX systems use the tip and ring lines to send control information, or to supply power to specialized telephone equipment in a manner that may damage telephone equipment that is not specially designed to work with the PBX. Consequently, the DAA circuitry in standard telephone equipment may be damaged or destroyed if the equipment is connected to a PBX having a non-standard wiring arrangement, or nonstandard electrical characteristics.

Because the telephone jacks used with these PBX systems are typically RJ-11 modules, they are indistinguishable from a standard telephone jack. Thus, a personal computer user who connects a modem to a hotel or office telephone system may have no way of knowing if the PBX in use at the hotel or office will damage the modem. As increasing numbers of people connect portable computers equipped with modems to telephone lines in hotel rooms and other facilities that use PBX systems, the likelihood of such damage is considerable.

To prevent damage to the DAA circuitry, many modem manufacturers use a fuse-type device. When the modem is taken "off-hook" while connected to a PBX that supplies power over the tip and ring lines at too high a voltage or current, the fuse burns out, thereby protecting the DAA circuitry. Unfortunately, once a fuse burns out, it must be physically replaced before the modem again will function. Other fuse-like devices, such as circuit breaking devices may also be employed to protect the DAA line interface circuitry.

Use of fuses or other fuse-like devices to protect the DAA circuitry, however, has a number of drawbacks. First, these devices typically are slow to react. Thus, the DAA circuitry must be designed to handle excessive voltage or current until the fuse can react. If a fuse is used, the fuse must be positioned in such a way that it is easily accessible and replaceable, or the modem may have to be returned to the manufacturer, at considerable cost in time and money, to replace the fuse.

Although it is relatively easy to provide access to a fuse on a large external modem, it is much more difficult to provide such access on a compact modem, such as a modem conforming to the PCMCIA specifications, or a mobile modem built into a portable computer. Most fuse-like devices, such as circuit breaking devices are too large to be used in a PCMCIA modem or mobile modem. Because PCMCIA modems and mobile modems typically are used with portable computers, which are most likely to be plugged into an unknown telephone system, some other protection means is needed.

U.S. Pat. No. 5,532,898 to Price describes one attempt to address the foregoing problems. That patent describes current sensing circuitry that generates a signal indicative of excessive line current. The signal is monitored by a microprocessor, that opens a relay when the line current exceeds a predetermined magnitude, thereby protecting the DAA line interface circuitry. The current sensing circuitry comprises numerous additional components separate from other modem and DAA line interface circuitry, and also requires a special purpose "excessive line current" signal. U.S. Pat. No. 5,696,660, also to Price, has an identical written description and claims monitoring a supply voltage present across the telephone line. The patent does not describe circuitry for performing this function, however, but only describes circuitry for monitoring line current.

Line current may not always be a good indicator of potentially damaging power levels on the phone. Some DAA circuitry limits the current at a fixed level, but does not limit the voltage. Because power is the product of current and voltage, even if the current is limited, increases in the voltage may cause the power to rise to levels that may damage the line interface circuitry. Protection circuitry that senses only excessive line current will not detect this condition, and may allow the DAA line interface circuitry to be damaged.

In view of the above, it would be desirable to provide apparatus and methods for protecting DAA line interface circuitry from electrical conditions on a phone line that are appropriate for use in a PCMCIA modem or mobile modem.

It would also be desirable to provide apparatus and methods of protecting DAA line interface circuitry that may be readily integrated with other existing ring detection circuitry, and that requires a minimum of additional components to implement.

SUMMARY OF THE INVENTION

It is an object of the present invention to provide apparatus and methods for protecting DAA line interface circuitry from electrical conditions which may be present on a telephone line.

It is a further object of the present invention to provide apparatus and methods for the protection of DAA line interface circuitry that may be readily integrated with existing ring detection circuitry, and requires a minimum number of additional components.

These and other objects are achieved by providing circuitry comprising an over-voltage detection circuit as part of or connected to the ring-detection circuitry of a telephone appliance, such as a modem.

When the modem is "on-hook", the ring-detect circuitry generates a signal indicative of a ring signal being sent on the telephone line. When the modem is "off-hook", the over-voltage detection circuitry generates a signal indicative of an over-voltage condition on the phone line. When such an over-voltage condition is indicated, a switch is opened causing the modem to be placed "on-hook", thereby breaking the circuit, and preventing damage to the DAA interface circuitry.

In a preferred embodiment, the voltage sensing circuitry that generates a control signal comprises a pair of zener diodes and a resistor connected to the ring detection circuitry, wired in parallel with the DAA line interface circuitry. The zener diodes are aligned so that they have opposing directions of forward current flow below the breakdown voltage. The control signal, which is used by both the ring-detection circuitry and the over-voltage detection circuitry, is sent to a controller, which causes a switch to open if the modem was off-hook when the signal was received, placing the modem on-hook.

An alternative embodiment provides separate over-voltage detection circuitry wired in parallel with the DAA line interface circuitry, and a separate control signal indicative of an over-voltage condition.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
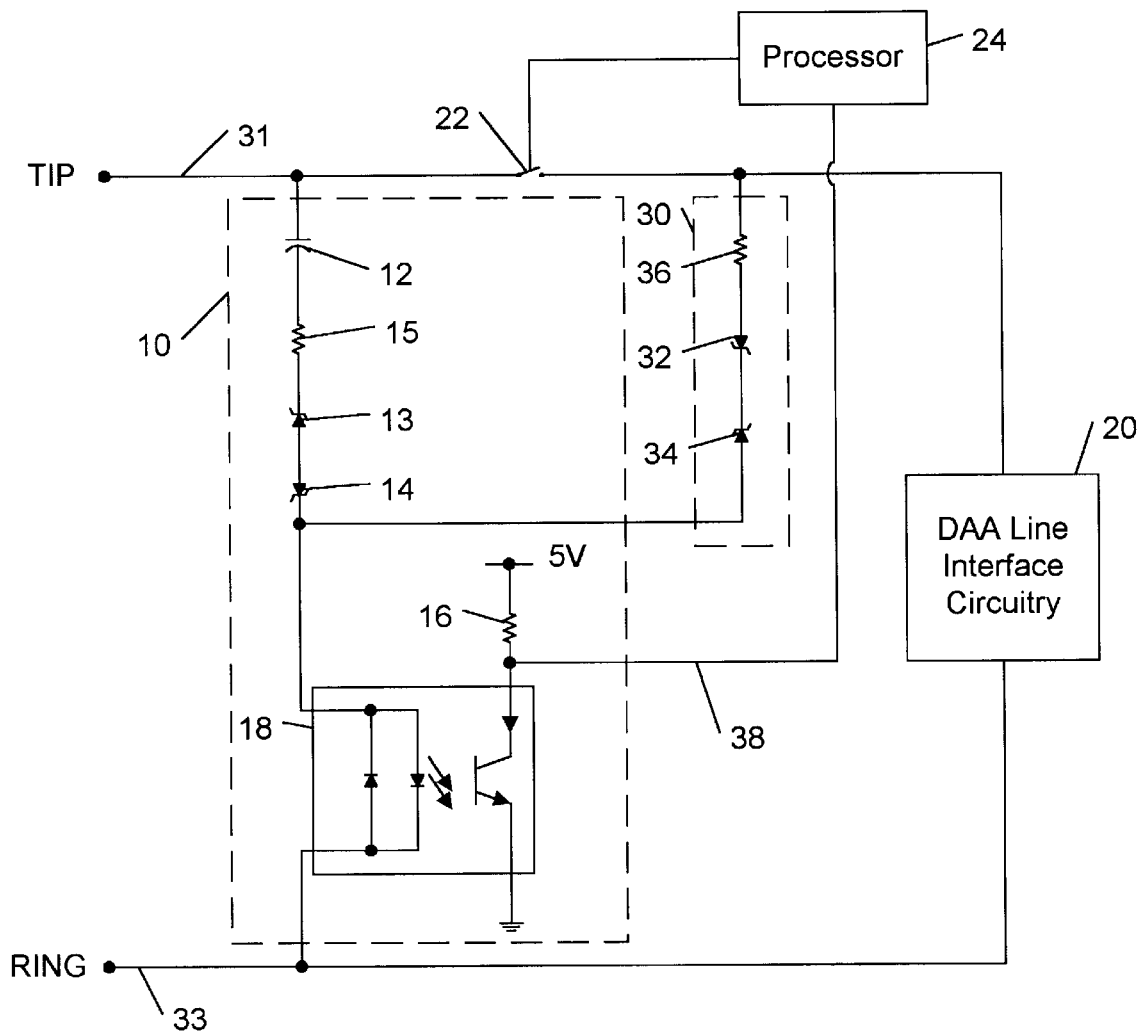
FIG. 1 is a schematic representation of a preferred embodiment of the protection circuitry of the present invention.

Referring to FIG. 1, a schematic representation of the protection circuitry of the present invention is shown, in combination with standard modem ring detection circuitry. Ring detect circuitry 10 comprises capacitor 12, zener diodes 13 and 14, which preferably have a breakdown voltage of approximately 20 volts, resistors 15 and 16, and opto-coupler 18. Ring detect circuitry 10 is coupled to a telephone subscriber loop in parallel with DAA line interface circuitry 20.

Switch 22, preferably a relay, determines the on/off hook status of the modem. When switch 22 is open, the modem is "on-hook", and no current flows through DAA line interface circuitry 20. When switch 22 is closed, the modem is "off-hook", and DAA line interface circuitry 20 is active. Switch 22 is controlled by processor 24, which determines whether the modem should be on-hook or off-hook based on a variety of inputs.

Over-voltage detection circuitry 30, built in accordance with the principles of the present invention, comprises zener diodes 32 and 34, which preferably have a breakdown voltage of approximately 12 volts, and resistor 36. Over-voltage detection circuitry 30 is connected between tip line 31, and opto-coupler 18, and is active only when switch 22 is closed (i.e. the modem is off-hook).

During normal operation, when the modem is on-hook, a direct current (DC) voltage of approximately 48 volts (50 volts in some countries) will be present between tip line 31 and ring line 33. In this state, no current will flow through ring detect circuitry 10 because capacitor 12 operates as an open circuit to direct current. No current will flow through over-voltage detection circuitry 30 or DAA line interface circuitry 20 because switch 22 is open. Ring-detect signal line 38 is pulled HIGH (i.e. at 5 volts DC) through resistor 16, indicating to processor 24 that the telephone line is idle.

When the central telephone office or PBX alerts the modem to an incoming call, it sends a ring signal on the telephone line. This ring signal appears as an alternating current (AC) signal with 30 to 150 volts peak-to-peak (Vp-p) at a frequency of approximately 20 cycle per second (Hz) between tip line 31 and ring line 33. In the presence of an alternating current signal with a high enough voltage level to pass through zener diodes 13 and 14, current flows through ring detect circuitry 10, causing opto-coupler 18 to pull ring-detect signal line 38 LOW (i.e. to ground) at approximately twice the frequency of the AC ring signal. Processor 24 detects the LOW level on ring-detect signal line 38, indicating that a ring signal is being sent. If processor 24 has been instructed to automatically answer incoming calls, it will close switch 22 in response to the ring-detect signal, taking the modem off-hook. Processor 24 may also take the modem off-hook if a user instructs the modem to initiate a call.

When the modem is taken off-hook, the voltage between tip line 31 and ring line 33 drops to approximately 6 to 11 volts, due to the internal resistance of the network (typically 400 to 1500 ohms), and an analog signal representing the data being transmitted and received may be present between the lines. In this state, DAA line interface 20 receives current, and is active, while zener diodes 13 and 14 prevent current from flowing through ring-detect circuitry 10. Since there is no current flowing through opto-coupler 18, ring detect signal line 38 is pulled HIGH.

In accordance with the principles of the present invention, if the modem is taken off-hook while connected to a nonstandard phone line which may damage DAA line interface circuitry 20, over-voltage detection circuitry 30 detects the condition, and causes the modem to go on-hook. When the modem is off-hook, if the voltage between tip line 31 and ring line 33 is greater than the combination of the breakdown voltage of either zener diode 32 or zener diode 34 (preferably approximately 12 volts), the forward voltage of the other of zener diodes 32 or 34 (preferably approximately 0.6 volts), and the forward voltage of opto-coupler 18 (preferably approximately 1 volt), current will flow through over-voltage detection circuitry 30 and opto-coupler 18. This will cause ring-detect signal line 38 to be pulled LOW. Processor 24 monitors ring-detect signal line 38, and is programmed to immediately open switch 22, placing the modem on-hook, if it detects a LOW level on ring-detect signal line 38 while the modem is off-hook. Placing the modem on-hook prevents damage by breaking the flow of current through DAA line interface circuitry 20. Thus, the over-voltage detection circuitry of the present invention uses part of the ring-detection circuitry and the ring-detect signal to provide over-voltage protection.

As shown in FIG. 1, only three relatively inexpensive components, two zener diodes and a resistor, need be added to standard modem ring-detection circuitry to provide over-voltage protection in accordance with the principles of the present invention. Using the above-described circuitry, high speed over-voltage protection can be added to a PCMCIA modem with minimal additional circuitry and expense.

Figure 2:
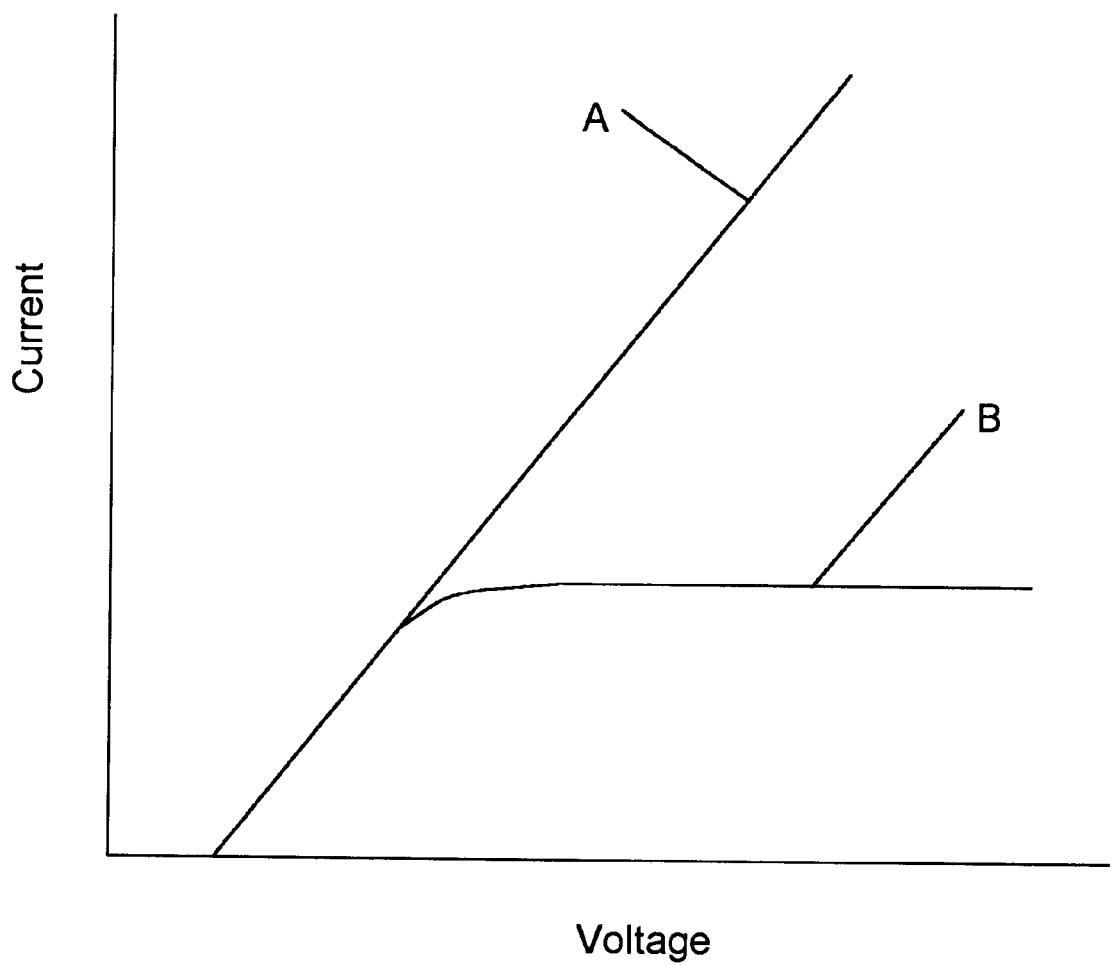
FIG. 2 is a graph showing a relationship between increases in voltage and in current using two different DAA line interface designs.

Advantageously, by sensing the voltage between tip line 31 and ring line 33, the protection circuit of the present invention prevents damage to the DAA line interface circuit even in situations where the loop current is limited. For example, as illustrated in FIG. 2, different DAA line interface circuitry designs may behave differently as the voltage between the tip and ring lines is increased. In the case of the circuitry characterized by curve A, the current increases as the voltage increases. The DAA circuitry may be damaged if too much power is applied. Because power is the product of voltage and current, for DAA line interface circuitry of the type that may be characterized by curve A, it is sufficient to detect either the loop current or the voltage between the tip and ring lines to determine when damage may occur.

In the DAA line interface circuitry characterized by curve B, the current increases as the voltage increases only until a current limit is reached. The voltage between the tip and ring lines may continue to increase, but the loop current remains approximately constant. As the voltage increases, the power (current×voltage) increases, potentially damaging the DAA line interface circuitry. This condition cannot be detected by simply sensing the loop current, because the current will not increase beyond the limit. The condition therefore only may be detected by sensing the voltage between the tip and ring lines, as in the protection circuit of the present invention.

Figure 3:
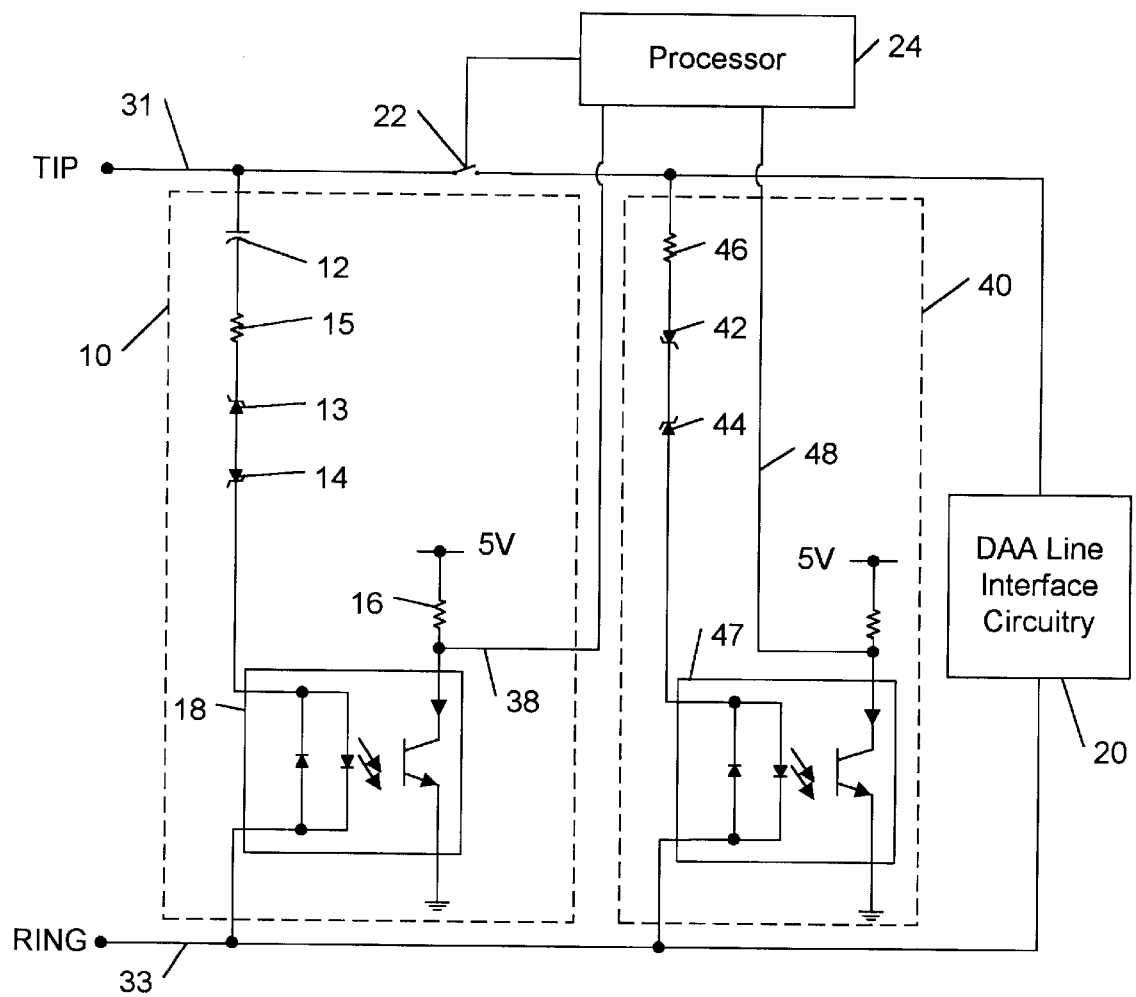
FIG. 3 is a schematic representation of an alternative embodiment of the protection circuitry of the present invention.

Referring now to FIG. 3, an alternative embodiment of the over-voltage protection device of the present invention is shown. Over-voltage detection circuitry 40 comprises zener diodes 42 and 44, and resistor 46, similar to those used in over-voltage detection circuitry 30 of FIG. 3. Additionally, over-voltage detection circuitry 40 comprises opto-coupler 47, which pulls over-voltage signal line 48 LOW to indicate an over-voltage condition.

When the modem is off-hook, if the voltage between tip line 31 and ring line 33 is greater than the combination of the breakdown voltage of either zener diode 42 or zener diode 44 (preferably approximately 12 volts), the forward voltage of the other of zener diodes 42 or 44 (preferably approximately 0.6 volts), and the forward voltage of opto-coupler 47 (preferably approximately 1 volt), current will flow through over-voltage detection circuitry 40 and opto-coupler 47. This will cause over-voltage signal line 48 to be pulled LOW. Processor 24 monitors over-voltage signal line 48, and is programmed to open switch 22, placing the modem on-hook, if it detects a LOW level on over-voltage signal line 48, thereby preventing damage to DAA line interface circuitry 20.

Use of this alternative embodiment may be appropriate in modems which use ring-detection circuitry that cannot be altered to share the ring-detect signal line with the over-voltage detection circuity. In general, this embodiment is less preferred than the embodiment shown with reference to FIG. 3, since it uses additional components, and an additional signal line.

While preferred illustrative embodiments of the present invention are described above, it will be evident to one skilled in the art that various changes and modifications may be made without departing from the invention. For example, the breakdown voltages of the zener diodes may be slightly changed, the functions ascribed to processor 24 may be performed by simple logic circuits, or opto-couplers 18 and 47 may be replaced with some other variety of switch. It is intended in the appended claims to cover all such changes and modifications which fall within the true spirit and scope of the invention.

What is claimed is:

1. Protection circuitry for use in a telephone appliance having line interface circuitry adapted to be coupled to a telephone line and ring-detection circuitry, the protection circuitry comprising:

a switch, connected between the interface circuitry and the telephone line, the switch selectively having an open state and a closed state wherein the line interface circuitry is coupled to the telephone line;

detection circuitry comprising a pair of diodes and portions of the ring-detection circuitry, connected to the telephone line in parallel with the line interface circuitry, to detect an over-voltage condition on the telephone line when the switch is closed, the diodes having a breakdown voltage above which current may flow through the diodes in a reverse direction, the diodes disposed with opposing directions of forward current flow at voltage levels below the breakdown voltage, the portions of the ring-detection circuitry generating a signal indicative of the over-voltage condition when the switch is closed and the voltage on the telephone line exceeds a predetermined voltage level determined by the breakdown voltage of the pair of diodes, wherein the ring-detection circuitry and the detection circuitry share a signal line connecting the ring-detection circuitry and the detection circuitry to the controller; and a controller coupled to the detection circuitry and the switch, the controller responsive to the signal causing the switch to assume the open state.

2. The protection circuitry of claim 1, wherein the pair of diodes are a pair of zener diodes.

3. The protection circuitry of claim 2, wherein the detection circuitry further comprises an opto-coupler connected in series with the pair of zener diodes, the opto-coupler generating the signal indicative of the over-voltage condition.

4. The protection circuitry of claim 2, wherein an over-voltage signal line connects the detection circuitry to the controller, the over-voltage signal line conveying the signal indicative of the over-voltage condition.

5. The protection circuitry of claim 1, wherein the ring-detection circuitry and the detection circuitry share an opto-coupler.

6. The protection circuitry of claim 1, wherein the controller comprises a processor programmed to cause the switch to assume the open state when the processor receives the signal indicative of the over-voltage condition while the switch is closed.

7. The protection circuitry of claim 1, wherein the telephone appliance comprises a modem.

8. The protection circuitry of claim 7, wherein the modem conforms to a specification of a PCMCIA card.

9. Protection circuitry for use in a modem, the modem electrically coupled to an external telephone subscriber line having a tip line and a ring line, the modem including ring-detection circuitry and line interface circuitry adapted to be coupled between the tip line and the ring line, the protection circuitry comprising:

a switch, connected in series in the tip line between the line interface circuitry and the external telephone subscriber line, the switch having an open state and a closed state, wherein the line interface circuitry is coupled to the tip and ring lines;

detection circuitry comprising a resistor and a pair of diodes coupled to the tip line, and an opto-coupler that also comprises a portion of the ring-detection circuitry, the detection circuitry being connected in parallel with the line interface circuitry between the switch and the line interface circuitry to detect an over-voltage condition on the tip and ring lines when the switch is closed, the diodes having a breakdown voltage above which current flows through the diodes in a reverse direction, the diodes disposed with opposing directions of forward current flow at voltage levels below the breakdown voltage, wherein the detection circuitry generates a signal indicative of the over-voltage condition when the switch is closed and the voltage between the tip and ring lines exceeds a predetermined voltage level determined by the breakdown voltage of the pair of diodes; and a controller coupled to the detection circuitry and the switch, the controller responsive to the signal to cause the switch to assume the open state.

10. The protection circuitry of claim 9, wherein the diodes comprise a pair of zener diodes.

11. The protection circuitry of claim 10, wherein the opto-coupler is coupled to the ring line and connected in series with the pair of zener diodes, the opto-coupler generating the signal indicative of the over-voltage condition.

12. The protection circuitry of claim 10, wherein an over-voltage signal line connects the detection circuitry to the controller, the over-voltage signal line conveying the signal indicative of the over-voltage condition.

13. The protection circuitry of claim 9, wherein the ring-detection circuitry and the detection circuitry share a signal line connecting the ring-detection circuitry and the detection circuitry to the controller.

14. The protection circuitry of claim 9, wherein the controller comprises a processor programmed to cause the switch to assume the open state when the processor receives the signal indicative of the over-voltage condition while the switch is closed.

15. The protection circuitry of claim 9, wherein the modem conforms to a specification of a PCMCIA card.

16. A method of protecting the line interface circuitry of a modem connected to a telephone line and ring-detection circuitry, the method comprising steps of:

using a switch to selectively open or close an electrical connection between the telephone line and the line interface circuitry;

detecting an over-voltage condition when the voltage on the telephone line exceeds a predetermined level using diodes having a breakdown voltage above which current may flow through the diodes in a reverse direction, the diodes disposed with opposing directions of forward current flow at voltage levels below the breakdown voltage, portions of the ring-detection circuitry being coupled to the diodes and generating a signal indicative of the over-voltage condition when the switch is closed and the voltage on the telephone line exceeds a predetermined voltage level determined by the breakdown voltage of the pair of diodes, wherein the ring-detection circuitry and the detection circuitry share a signal line connecting the ring-detection circuitry and the detection circuitry to the controller; and opening the electrical connection between the telephone line and the line interface circuitry when the over-voltage condition is detected and the electrical connection between the telephone line and the line interface circuitry is closed.

17. The method of claim 16, wherein the step of opening the electrical connection comprises steps of receiving the signal indicative of the over-voltage condition, and opening the electrical connection responsive to the signal.

* * * * *